Patented June 15, 1926.

1,589,188

UNITED STATES PATENT OFFICE.

DAVID L. LONG, OF OAKLAND, CALIFORNIA.

WATERPROOF AND FIREPROOF PAINT.

No Drawing.   Application filed April 29, 1924.   Serial No. 709,801.

My invention is an improved water-proof and fire-proof paint.

My paint is particularly applicable to metallic surfaces, which are subjected to a high temperature. My paint is intended primarily for surfaces which are subjected to heat and which it is desired shall be maintained substantially the same color as they are painted. It is well known that when radiators are painted with white or any other light colored paint, that this soon discolors, the white becoming usually a yellow. Moreover most paints have a tendency to crack off from radiators or the like, due to the expansion and contraction of the metal.

When used upon radiators there is no reduction in the radiation of heat therefrom, because of the metallic content of the paint which acts as a conductor of heat, and not as an insulant.

This paint will oxidize very slowly and consequently will retain its original lustre and color for a long period of time.

My paint is composed of the following ingredients, in about the following proportions:

|  | Gal. |
|---|---|
| Linseed oil | 1 |
| Portland cement | 1½ |
| White lead | ½ |
| Commercial zinc oxide | ½ |

To each gallon of the four above mentioned ingredients add one ounce of carbon tetrachloride as a dryer.

The linseed oil and Portland cement are first mixed, and allowed to remain for eight days, during which time it is frequently stirred. At the expiration of this period the cement is entirely suspended in the oil. The white lead, and zinc are now added and thoroughly mixed with the oil and cement by stirring or beating.

Finally an ounce of carbon tetrachloride is added for each gallon of the above named mixture, as a dryer.

The above proportions of paint are illustrative of satisfactory quantities and it will be noted that the amount of Portland cement is large in proportion to the linseed oil, which may be designated as a drying oil.

In the formula given, the white lead and commercial zinc oxide form the base to give a white colored paint of lasting qualities. The white lead itself has a tendency to discolor by oxidation.

Having described my invention, I claim:

1. A paint comprising a drying oil, Portland cement to a quantity equal to or not more than one and one half as much as the oil, white lead in a lesser proportion than the oil and commercial zinc oxide in substantially the same proportion as of white lead.

2. A paint comprising linseed oil in the proportion of one gallon, Portland cement, one and one-half gallons, white lead one-half gallon and zinc oxide one-half gallon.

3. A paint comprising linseed oil in the proportion of one gallon, Portland cement one and one-half gallons, white lead one-half gallon, zinc oxide one-half gallon and three and one-half ounces of carbon tetrachloride.

In testimony whereof I affix my signature.

DAVID L. LONG.